US010957077B2

(12) United States Patent
Cahill (10) Patent No.: US 10,957,077 B2
(45) Date of Patent: Mar. 23, 2021

(54) SYSTEMS AND METHODS FOR OBTAINING OPINION DATA FROM INDIVIDUALS VIA A WEB WIDGET AND DISPLAYING A GRAPHIC VISUALIZATION OF AGGREGATED OPINION DATA WITH WAVEFORMS THAT MAY BE EMBEDDED INTO THE WEB WIDGET

(71) Applicant: Warple Inc., Omaha, NE (US)

(72) Inventor: Edmund J. Cahill, Omaha, NE (US)

(73) Assignee: Warple Inc., Omaha, NE (US)

( * ) Notice: Subject to any disclaimer, the term of this patent is extended or adjusted under 35 U.S.C. 154(b) by 595 days.

(21) Appl. No.: 15/692,530

(22) Filed: Aug. 31, 2017

(65) Prior Publication Data

US 2018/0061087 A1    Mar. 1, 2018

Related U.S. Application Data (60) Provisional application No. 62/384,647, filed on Sep. 7, 2016, provisional application No. 62/382,711, filed on Sep. 1, 2016.

(51) Int. Cl.

| | |
|---|---|
| *G06T 11/00* | (2006.01) |
| *G06T 15/00* | (2011.01) |
| *G06T 19/20* | (2011.01) |
| *G06Q 30/02* | (2012.01) |
| *G06F 3/0484* | (2013.01) |

(Continued)

(52) U.S. Cl.
CPC ........ *G06T 11/001* (2013.01); *G06F 3/04847* (2013.01); *G06Q 30/0201* (2013.01); *G06Q 50/01* (2013.01); *G06T 3/60* (2013.01); *G06T 11/206* (2013.01); *G06T 15/005* (2013.01);

(Continued)

(58) Field of Classification Search
CPC .. G06F 17/277; G06F 17/2785; G06F 17/289; G06F 3/04842; G06F 3/04847; G06F 3/60; G06Q 30/0245; G06Q 30/0201; G06Q 30/02; G06Q 30/0203; G06Q 50/01; G06T 11/001; G06T 11/206; G06T 3/60;

(Continued)

(56) References Cited

U.S. PATENT DOCUMENTS

| | | | |
|---|---|---|---|
| 6,295,092 B1 * | 9/2001 | Hullinger | H04H 60/37 |
| | | | 348/461 |
| 10,003,560 B1 * | 6/2018 | Perkins | H04L 51/32 |

(Continued)

*Primary Examiner* — Thu V Huynh
(74) *Attorney, Agent, or Firm* — Pillsbury Winthrop Shaw Pittman, LLP (57) ABSTRACT

Opinion data may be obtained from individuals via a web widget and a graphic visualization of aggregated opinion data may be displayed via the web widget. The web widget may be provided for presentation via one or more third-party webpages. The web widget may include an input portion and a graphic visualization portion. A first instance of the web widget may be presented via a first third-party webpage. Via the input portion, input from users may be received on a plurality of aspects of one or more topics. The input may convey users' opinions of the plurality of aspects. The input may be received responsive to the users manipulating the input portion of the web widget. The graphical visualization may be updated in real time to represent input received from a plurality of users from a plurality of third-party web sites, or anywhere where the web widget may be displayed.

20 Claims, 8 Drawing Sheets

(51) Int. Cl.
*G06T 3/60* (2006.01)
*G06Q 50/00* (2012.01)
*G06T 11/20* (2006.01)

(52) U.S. Cl.
CPC .......... *G06T 19/20* (2013.01); *G06T 2200/24* (2013.01); *G06T 2219/2016* (2013.01)

(58) Field of Classification Search
CPC ... G06T 15/005; G06T 19/20; G06T 2200/24; G06T 2219/2016
See application file for complete search history.

(56) References Cited

U.S. PATENT DOCUMENTS

| | | | | |
|---|---|---|---|---|
| 2003/0167315 A1* | 9/2003 | Chowdhry | ............... | H04L 67/02 709/218 |
| 2008/0059308 A1* | 3/2008 | Gerken | ................. | G06Q 30/02 705/14.44 |
| 2009/0094286 A1* | 4/2009 | Lee | ....................... | G06Q 30/02 |
| 2010/0306099 A1 | 12/2010 | Hirson et al. | | |
| 2012/0069131 A1 | 3/2012 | Abelow | | |
| 2012/0238242 A1 | 9/2012 | Hirson et al. | | |
| 2013/0198376 A1* | 8/2013 | Landa | .................... | G06Q 10/04 709/224 |
| 2014/0046726 A1* | 2/2014 | Brandt | ............... | G06Q 30/0203 705/7.32 |
| 2014/0046861 A1* | 2/2014 | Dodson | .................. | G06Q 50/01 705/319 |
| 2014/0100924 A1 | 4/2014 | Ingenito et al. | | |
| 2014/0215508 A1* | 7/2014 | Wyatt | ................ | H04N 21/4758 725/24 |
| 2014/0220927 A1 | 8/2014 | Girard et al. | | |
| 2014/0278835 A1* | 9/2014 | Moseson | ................ | G06Q 50/01 705/12 |
| 2014/0280052 A1* | 9/2014 | Alonso | ................... | G06Q 50/01 707/722 |
| 2015/0077326 A1 | 3/2015 | Kramer et al. | | |
| 2016/0086108 A1 | 3/2016 | Abelow | | |
| 2016/0267490 A1* | 9/2016 | Johnson | ................ | G06Q 30/018 |
| 2016/0323393 A1* | 11/2016 | Umphreys | ............. | H04L 67/22 |
| 2017/0039988 A1* | 2/2017 | Whiting | ................ | G06F 3/0482 |

* cited by examiner

SYSTEMS AND METHODS FOR OBTAINING OPINION DATA FROM INDIVIDUALS VIA A WEB WIDGET AND DISPLAYING A GRAPHIC VISUALIZATION OF AGGREGATED OPINION DATA WITH WAVEFORMS THAT MAY BE EMBEDDED INTO THE WEB WIDGET

CROSS-REFERENCE TO RELATED APPLICATIONS

This patent filing claims the benefit of U.S. Provisional Patent Application 62/384,647, titled SYSTEMS AND METHODS FOR OBTAINING OPINION DATA FROM INDIVIDUALS VIA A WEB WIDGET AND DISPLAYING A GRAPHIC VISUALIZATION OF AGGREGATED OPINION DATA VIA THE WEB WIDGET, filed 7 Sep. 2016; and this patent filing claims the benefit of U.S. Provisional Patent Application 62/382,711, titled SYSTEMS AND METHODS FOR OBTAINING OPINION DATA FROM INDIVIDUALS VIA A WEB WIDGET AND DISPLAYING A GRAPHIC VISUALIZATION OF AGGREGATED OPINION DATA VIA THE WEB WIDGET, filed 1 Sep. 2016. The contents of each afore-mentioned, earlier filed application is hereby incorporated by reference in its entirety.

FIELD OF THE DISCLOSURE

This disclosure relates to systems and methods configured for obtaining opinion data from individuals via a web widget and displaying a graphic visualization of data sets such as aggregated opinion.

BACKGROUND

Conventional polling and survey systems typically receive input and give results on a single aspect of one item of interest. The graphical user interfaces (GUIs) are lacking and receive user input in the form of a number (e.g., four out of five stars, or 8 on a scale of 1-10). There is not a fine level of granularity present. Further, the output is often merely an average or sum. These systems fail to provide detailed views of data collected or distributions within data sets.

SUMMARY

Exemplary implementations disclosed herein provide improved systems and methods for receiving data through an improved GUI. An improved way of presenting aggregated data is also provided. This data may be related to one or more of user opinions, polls, surveys, and/or any other type of data or datasets. In some implementations, the technology provides a novel way to view data and/or quantify data. It also provides a novel way of displaying an entire/aggregate data set (as opposed to simply displaying averages, means, medians, etc.). Attempts at providing detailed and comprehensive views of datasets have been unsuccessful in the past due to complexity. The present technology utilizes a novel approach to visualization that reduces complexity and facilitates conveyance and understanding.

Accordingly, one aspect of the disclosure relates to a system configured for obtaining opinion data from individuals via a web widget and displaying a graphic visualization of aggregated opinion data via a waveform or plurality of waveforms displayed in the web widget. The system may comprise one or more hardware processors configured by machine-readable instructions to provide the web widget for presentation via one or more third-party webpages. The web widget may include an input portion and a graphic visualization portion. A first instance of the web widget may be presented via a first third-party webpage. The system may be configured to receive, via the input portion, input from users on a plurality of aspects of one or more topics from a plurality of third-party web sites or anywhere the web widget may be displayed. The input may convey the users' opinions of the plurality of aspects. The input may be received responsive to the users manipulating the input portion of the web widget. The input from a first user may be received via the first instance of the web widget presented via the first third-party webpage responsive to the first user manipulating an input portion of the first instance of the web widget. The system may be configured to aggregate the received input to produce an aggregated dataset representing the users' collective opinion of the plurality of aspects of the one or more topics. The aggregated dataset may be updated responsive to the input from the first user being received. The system may be configured to update the graphic visualization portion to reflect the aggregated dataset responsive to the aggregated dataset being updated by receiving input from a plurality of users from a plurality of third party-web sites or anywhere where the web widget may be displayed. The graphic visualization portion may include a plurality of aggregated dataset waveforms corresponding to the plurality of aspects. A given waveform may be defined such that (1) a horizontal plane that corresponds to an aggregated number or percentage of users that provided input and (2) a dimension parallel to the axis corresponds to a strength or magnitude of aggregated sentiment or opinion, neutral sentiment or opinion being at the plane, stronger sentiment or opinion being further from the plane, and weaker sentiment or opinion being closer to the plane.

Another aspect of the disclosure relates to a method for obtaining opinion data from individuals via a web widget and displaying a graphic visualization of aggregated opinion data via the web widget. The web widget may be provided for presentation via one or more third-party webpages. The web widget may include an input portion and a graphic visualization portion. A first instance of the web widget may be presented via a first third-party webpage. The system may be configured to receive, via the input portion, input from users on a plurality of aspects of one or more topics. The input may convey the users' opinions of the plurality of aspects. The input may be received responsive to the users manipulating the input portion of the web widget. The input from a first user may be received via the first instance of the web widget presented via the first third-party webpage responsive to the first user manipulating an input portion of the first instance of the web widget. The received input may be aggregated to produce an aggregated dataset representing the users' collective opinion of the plurality of aspects of the one or more topics. The aggregated dataset may be updated responsive to the input from the first user being received. The system may be configured to update the graphic visualization portion to reflect the aggregated dataset responsive to the aggregated dataset being updated. The graphic visualization portion may include a plurality of aggregated dataset waveforms corresponding to the plurality of aspects. A given waveform may be defined such that (1) a horizontal plane that corresponds to an aggregated number or percentage of users that provided input and (2) a dimension parallel to the axis corresponds to a strength or magnitude of aggregated sentiment or opinion, neutral sentiment or opinion being at the plane, stronger sentiment or opinion being further from the plane, and weaker sentiment or opinion being closer to the plane. These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
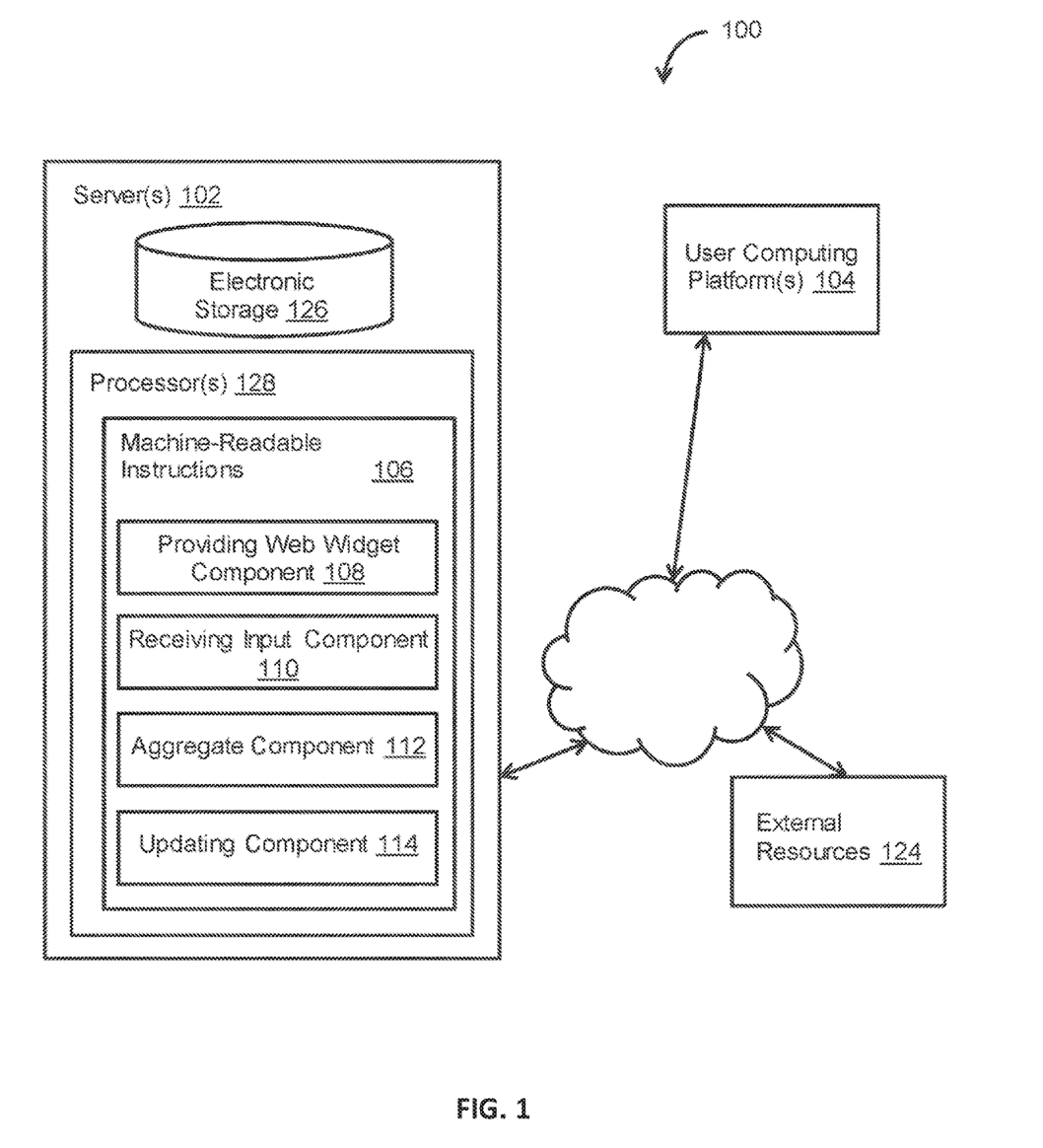
FIG. 1 illustrates a system configured for obtaining opinion data from individuals via a web widget and displaying a graphic visualization of aggregated opinion data collected via the web widget from a plurality of web widgets from any number of third-party web sites, apps, or digital content where a web widget may be embedded, in accordance with one or more implementations.

FIG. 1 illustrates a system configured for obtaining opinion data from individuals via a web widget and displaying a graphic visualization of aggregated opinion and/or sentiment data via the web widget, in accordance with one or more implementations. In some implementations, system 100 may include one or more servers 102. The server(s) 102 may be configured to communicate with one or more user computing platforms 104 according to a client/server architecture. The users may access system 100 via user computing platform(s) 104.

The server(s) 102 and/or computing platform(s) 104 may be configured to execute machine-readable instructions 106. The machine-readable instructions 106 may include one or more of a providing web widget component 108, a receiving input component 110, an aggregate component 112, and updating component 114, and/or other components. The providing web widget component 108 may be configured to provide the web widget for presentation via one or more third-party webpages. The receiving input component 110 may be configured to receive input from users on a plurality of aspects of one or more topics. The aggregate component 112 may be configured to aggregate received input to produce an aggregated dataset representing users' collective opinion of the plurality of aspects of the one or more topics. The updating component 114 may be configured to update the graphic visualization portion to reflect the aggregated dataset responsive to the aggregated dataset being updated.

Figure 2:
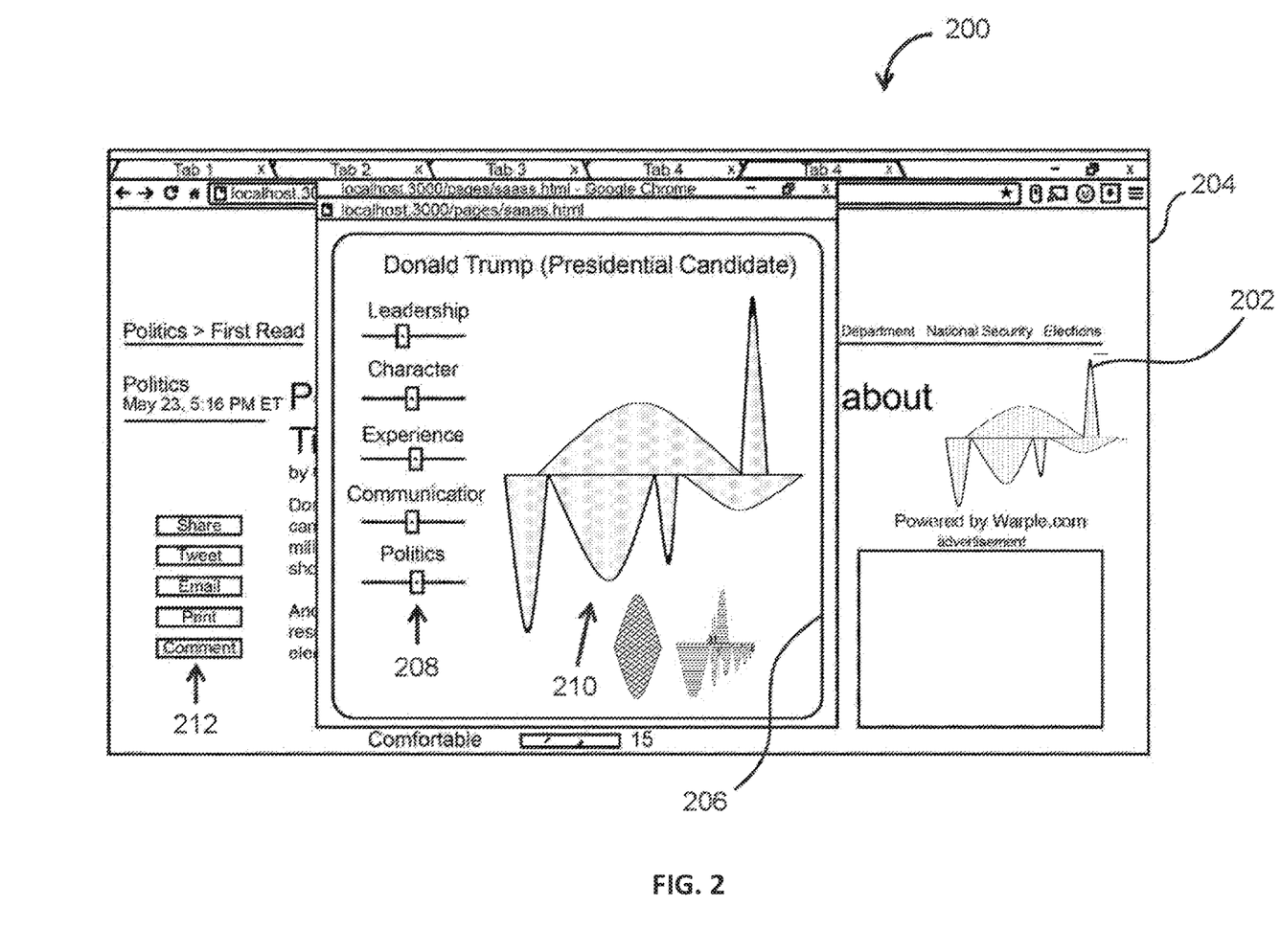
FIG. 2 illustrates a web widget and GUI, in accordance with one or more implementations.

FIG. 2 illustrates a web widget and GUI 200, in accordance with one or more implementations. As mentioned, the providing web widget component 108 may be configured to provide the web widget 202 for presentation via one or more third-party webpages 204. The web widget 202 may be selected and expanded into expanded web widget 206. Expanded web widget 206 may include an input portion 208 and a graphic visualization portion 210. A first instance of web widget 202 and/or expanded web widget 206 may be presented via first third-party webpage 204. System 100 may be configured to receive, via input portion 208, input from users on a plurality of aspects of one or more topics. Input portion 208 is depicted as comprising sliders (which may be continuous or discrete); however, input portion 208 may include buttons or any other viable input mechanism. The input may convey the users' opinions of the plurality of aspects. As one example, users may convey their opinion of a presidential candidate (possibly in real-time while the candidate is debating). In the example shown, Donald Trump is being judged (or surveyed or polled or rated) with respect to five aspects: leadership, character, experience, communication, and politics. It is contemplated that any type or number of aspects may be rated. A user may, for example, slide the leadership slider all the way to the right to indicate a very positive sentiment or opinion regarding Trump's leadership skill. A user may, for example, slide the character slider all the way to the left to indicate a very negative sentiment or opinion regarding Trump's character. A user may, for example, slide the experience slider to the middle to indicate very neutral sentiment and/or opinion regarding Trump's experience. The aspects may vary for Trump with other instances of expanded widget 206 and/or widget 202. Instead of Trump, a user may desire to instantiate expanded widget 206 and/or widget 202 that relates to a restaurant or a sports team, for example. For simplicity, at times sentiment may be mentioned by itself or opinion may be mentioned by itself. However, it is understood that sentiment and/or opinion may apply in these instances.

In some implementations, social media buttons 212 may be used by the users. The users may meet people online and communicate with them. Users may learn each other's views on various topics, share photos, etc.

The input may be received responsive to the users manipulating input portion 208 of web widget 202 and/or expanded web widget 206. The input from a first user may be received via the first instance of expanded web widget 206 and/or web widget 202 presented via first third-party webpage 204 responsive to the first user manipulating input portion 208 of the first instance of expanded web widget 206 and/or web widget 202. System 100 may be configured to aggregate the received input to produce an aggregated dataset representing the users' collective opinion of the plurality of aspects of the one or more topics (in this example, the topic is Donald Trump). The topic could be about anyone or anything, however.

The aggregated dataset may be updated responsive to the input from the first user being received. System 100 may be configured to update the graphic visualization portion 210 to reflect the aggregated dataset responsive to the aggregated dataset being updated. The graphic visualization portion may include a plurality of aggregated dataset waveforms corresponding to the plurality of aspects.

Figure 3:
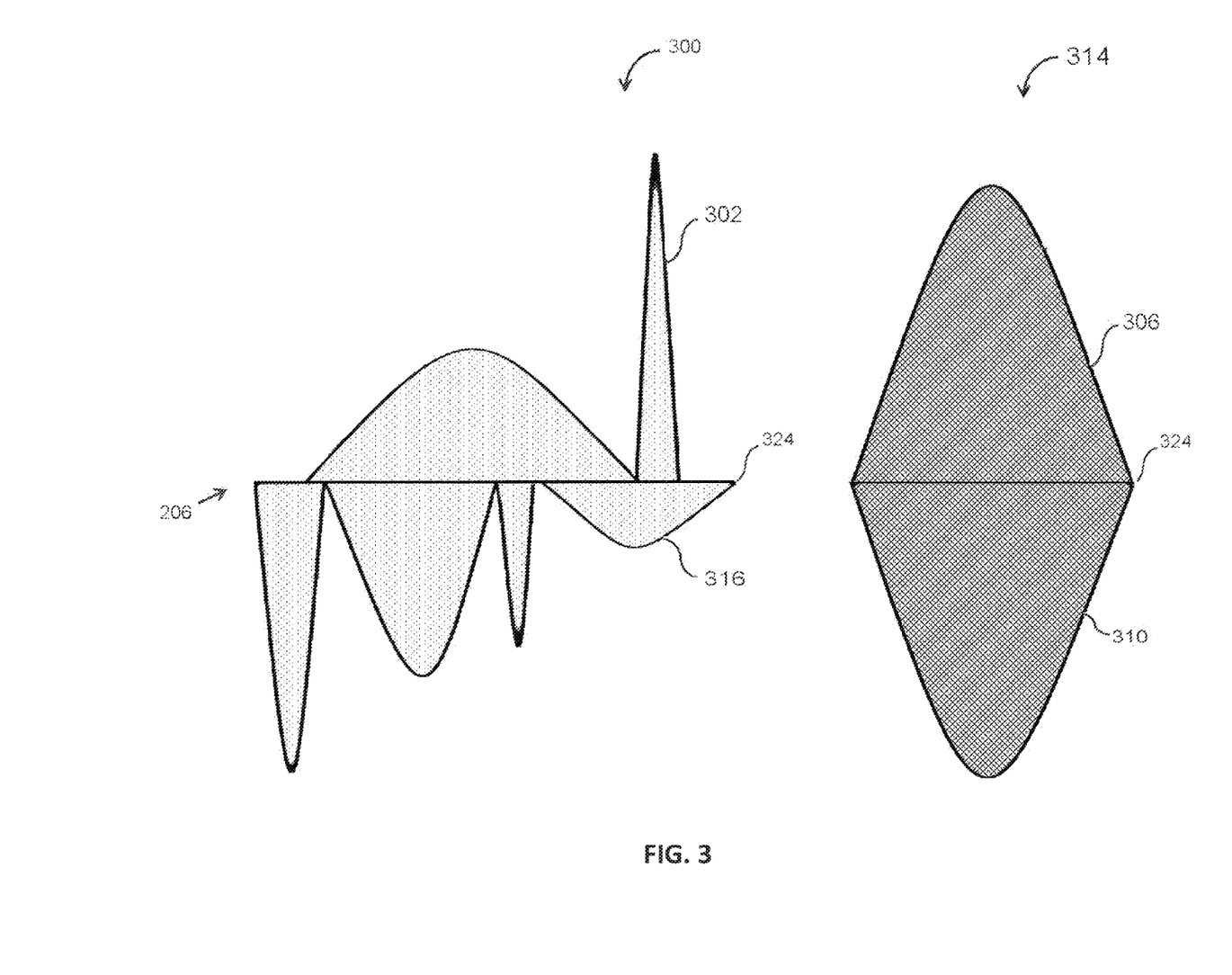
FIG. 3 illustrates a display of a graphic visualization of aggregated opinion data via the web widget, in accordance with one or more implementations.

FIG. 3 illustrates a display of a graphic visualization of aggregated opinion data via expanded web widget 206 and/or web widget 202, in accordance with one or more implementations. A given waveform may be defined such that (1) a horizontal plane corresponds to an aggregated number or percentage of users that provided input and (2) a dimension parallel to the axis corresponds to a strength of aggregated sentiment and/or opinion, with neutral sentiment and/or opinion being at plane 324, stronger sentiment and/or opinion being further from plane 324, and weaker opinion being closer to plane 324.

In some implementations, there may be multiple waveforms representing different aspects, each represented by one or more of a different color, shade, cross-hatching, number, and/or any other designator. Any number of aspects and waveforms may be implemented. Cross-hatching has been used to differentiate between colors (aspects) or the like in the drawings. In one example, aggregated dataset waveform 300 will be, for example, green and relate to the perceived leadership of Donald Trump. The distance between aggregated dataset waveform segment 302 peak (with respect to its base) from plane 324 represents the strength of the aggregated opinion (i.e., intensity of response). The width of the base would indicate the percent of the users shared this same opinion on a given aspect at a given level of intensity of sentiment. In some implementations, if aggregated dataset waveform 302 peak were only half as high in reference to the distance from plane 324, this would indicate a medium strength of aggregated opinion for the given aspect at a given level of intensity. In this particular case, the peak of aggregated dataset waveform segment 302 is at the highest magnitude possible and its base is 5 percent of the total length of the horizontal plane. This means that 5 percent of users who voted for this aspect voted for the highest level of intensity of sentiment and/or opinion represented by aggregated dataset waveform segment 302. Aggregated dataset waveform segment 316 is pointing downward, and is of a low magnitude. This indicates very weak sentiment and/or opinion and that the sentiment and/or opinion is negative. The base of aggregated dataset waveform 316 is 20 percent of the total aggregate response for this aspect. This indicates that 20 percent of the users voted in this manner. If the aggregate dataset were to represent 5 percent of the total responses, the width of the base of aggregated dataset waveform segment 316 would be 5 percent of the total length of a horizontal plane, similar to waveform segment 302.

In contrast, aggregated dataset waveform-314 has a different cross-hatching and are therefore of another color and related to a different aspect (e.g., communication skills). Aggregate data set waveform 314 has two waveform segments 306 and 310. Waveform 306 is pointing upward and is of a high magnitude representing a strong positive response. Waveform 310 is pointing downward and is of high magnitude representing a strong negative response. The base of waveforms 306 and 310 are equal representing that half, or 50%, of the total users voted in this manner for this aspect.

It is also envisioned that where technologically feasible, the waveform may be rendered in three dimensions to allow users to rotate, interact with, and/or zoom into and out of expanded web widget 206 and/or web widget 202 in some implementations using the GUI. This will give them a better view of aggregate data sets and distributions within the data set and how they are changing (potentially in real time). In some implementations, instead of a slider, buttons may be implemented. These buttons could read, for example, "totally incredible," "horrible," "just okay," "totally," "no," "never," "yes," "absolutely," "not," "always," "not always", or anything else. The input to the buttons or sliders 208 may be translated to a number between −10 and +10, for example, which represents the level of intensity of sentiment, and whether it is positive or negative. The number zero could be used to represent a neutral opinion, for example. It is contemplated that any other numbers or ranges of numbers could be implemented according to this technology. In some implementations, there is no averaging or mean or median taken. In some implementations, no subtraction is performed between positive and negative opinions. In some implementations, as a slider is moved there will be a corresponding change in representative words (relating to opinions) as far as one or more of font, boldness, color, and/or anything else.

Figure 4:
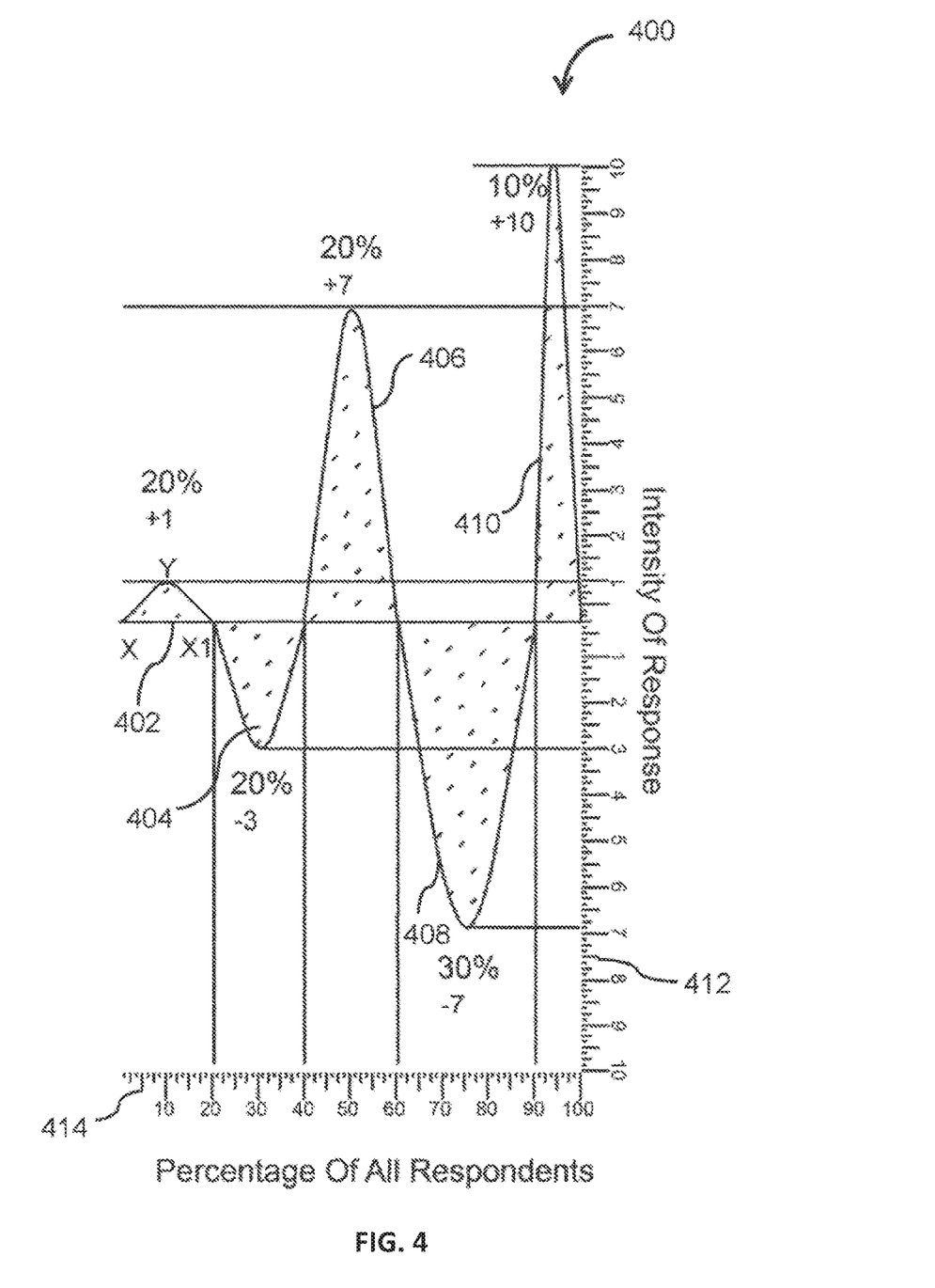
FIG. 4 illustrates a display of a graphic visualization of aggregated opinion data via the web widget, in accordance with one or more implementations.

FIG. 4 illustrates a display of a graphic visualization 400 of aggregated opinion data via expanded web widget 206 and/or web widget 202, in accordance with one or more implementations. Aggregated dataset waveforms 402, 404, 406, 408, and 410 are shown to be of the same cross-hatching. This may indicate that they are of the same color and represent the same aspect (e.g., Donald Trump's leadership skills). Note that a vertical axis 412 represents an intensity of response. In some implementations, vertical axis 412 ranges from zero to ten in an upward (positive) direction, and from zero to ten in a downward (negative) direction. Note that a horizontal axis 414 represents a percentage of respondents. In some implementations, horizontal axis 414 ranges from zero to 100 percent. Aggregated dataset waveform segment 402 spans from point X to point X1 in a horizontal direction across 20 percentage points. Aggregated dataset waveform segment 402 has its peak at point Y. This represents that 20 percent of the user responses were positive 1 (a positive but weak sentiment). Aggregated dataset waveform segment 410 spans across 10 percentage points in a horizontal direction. Aggregated dataset waveform segment 410 has its peak at 10 in a positive direction. This represents that 10 percent of the user responses were positive 10 (a positive and very strong sentiment). In this case, the overall plot area of aggregated dataset waveform segment 410 is much larger than that of aggregated dataset waveform 402 simply because of the intensity. In some implementations, according to the present technology, by plotting intensity (positive and negative) on a vertical axis and percentage on a horizontal axis, weighting occurs organically and/or naturally. In some implementations, three points may be plotted for a given aggregated dataset waveform (e.g., X, X1, and Y) to form a triangle and/or to form an aggregated dataset waveform.

The above-described 'POW Graph' (Percentages of the Whole) is a novel way of displaying large and complex data sets, such as public opinion, in a format that reduces effort to interpret & understand the ideas & statistics the data represents. The POW Graph is unique in the respect that, among other features, the data sets it can display are virtually infinite in size. This allows the POW Graph to display highly varied data sets with elegance and simplicity in a consistent format that is not dependent on, or limited by, the size or complexity of the data set being displayed.

Due to its novelty, the POW Graph has widely varied application and use cases. In a digital media, web sites, native applications and virtually all digital content contexts—the POW Graph may be used to create detailed, interactive, real time or near real time views of data sets.

Because of the advantages the POW Graph provides in communicating & conveying complex ideas and/or large data sets, it also has application in traditional media contexts such as television, print media and other static 2 dimensional contexts.

The POW graph, in some embodiments, makes novel use of a modified Cartesian coordinate system and waveforms to represent large and complex data sets. In traditional Cartesian plotting the horizontal (or X) axis typically represents an absolute value, or abscissa. This traditional use is suitable for plotting absolute values, but fails to display relativity or distributions. Using a modified Cartesian plotting methodology, the POW graph uses the horizontal (or X) axis to represent a percentage of a whole by relating a horizontal (or X) axis segment width to the percentage of a data set population or grouping. In traditional Cartesian plotting the vertical (or Y) axis is used to represent an absolute value. The POW graph utilizes this methodology to represent positive values plotted above the horizontal (or X) axis and negative values plotted below the horizontal (or X) axis. The resulting 3 coordinates, 2 on the horizontal (or X) axis and one in the vertical (or Y) axis, compose a waveform representing a percentage of a data set. The result of these methods is a graphical representation of large and complex data sets that is elegant, scalable, and reduces effort to interpret & understand data.

Due to its novelty, the POW Graph has widely varied application and use cases. In a digital media, web sites, native applications and virtually all digital content contexts—the POW Graph may be used to create detailed, interactive, real time or near real time views of data sets. Because of the advantages the POW Graph provides in communicating & conveying complex ideas and/or large data sets, it also has application in traditional media contexts such as television, print media, and other static contexts and/or uses.

Figure 5A:
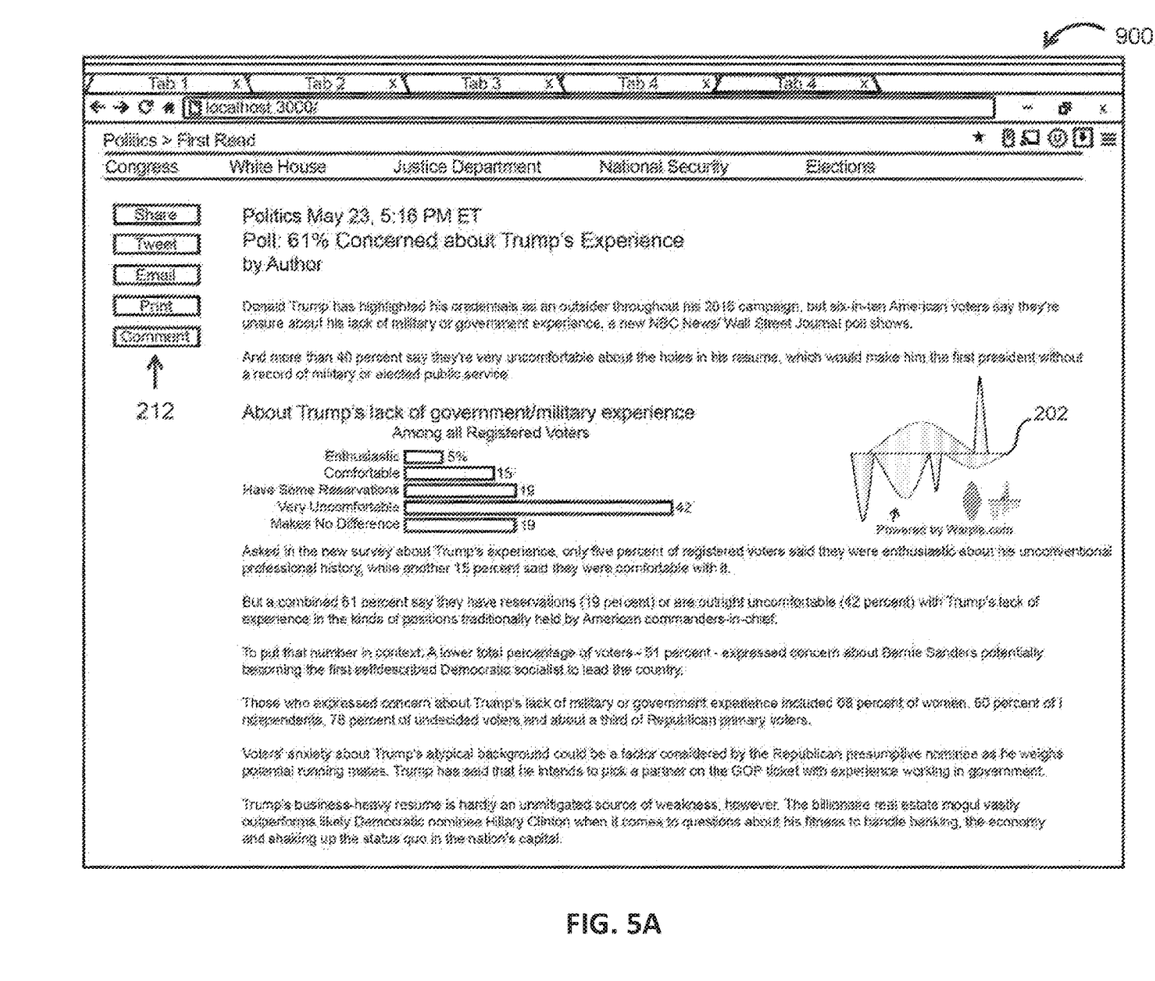
FIGS. 5A and 5B illustrate exemplary views of a computer screen showing survey results, in accordance with one or more implementations.
Figure 5B:
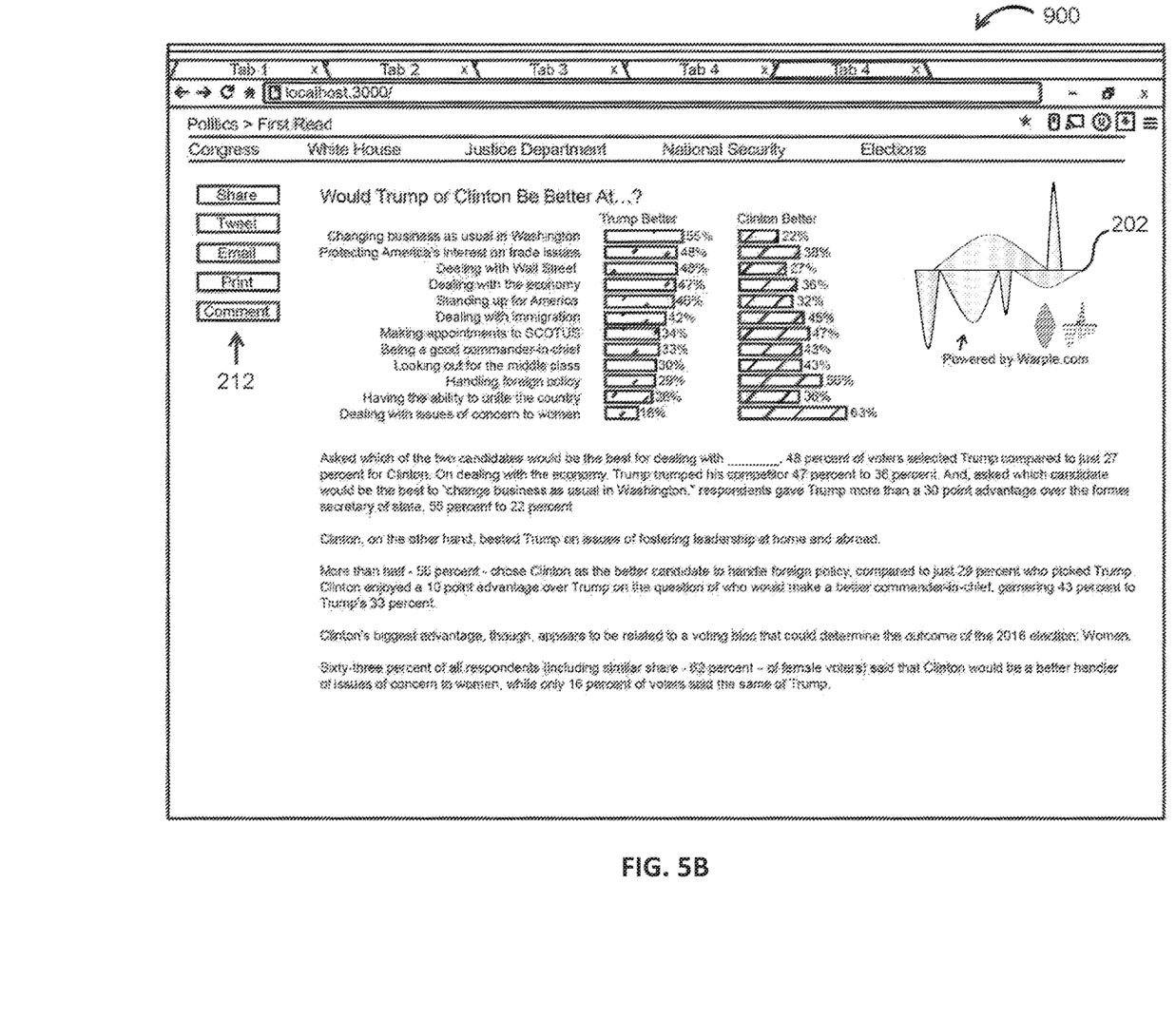

FIGS. 5A and 5B illustrate exemplary views of a computer screen 900 showing survey results, in accordance with one or more implementations. The results may be static or may change in real-time. Web widget 202 may be actuated (e.g., clicked with a mouse) in order to bring up expanded web widget 206 of FIG. 2. In some implementations, social media buttons 212 are present and may be actuated.

Figure 6:
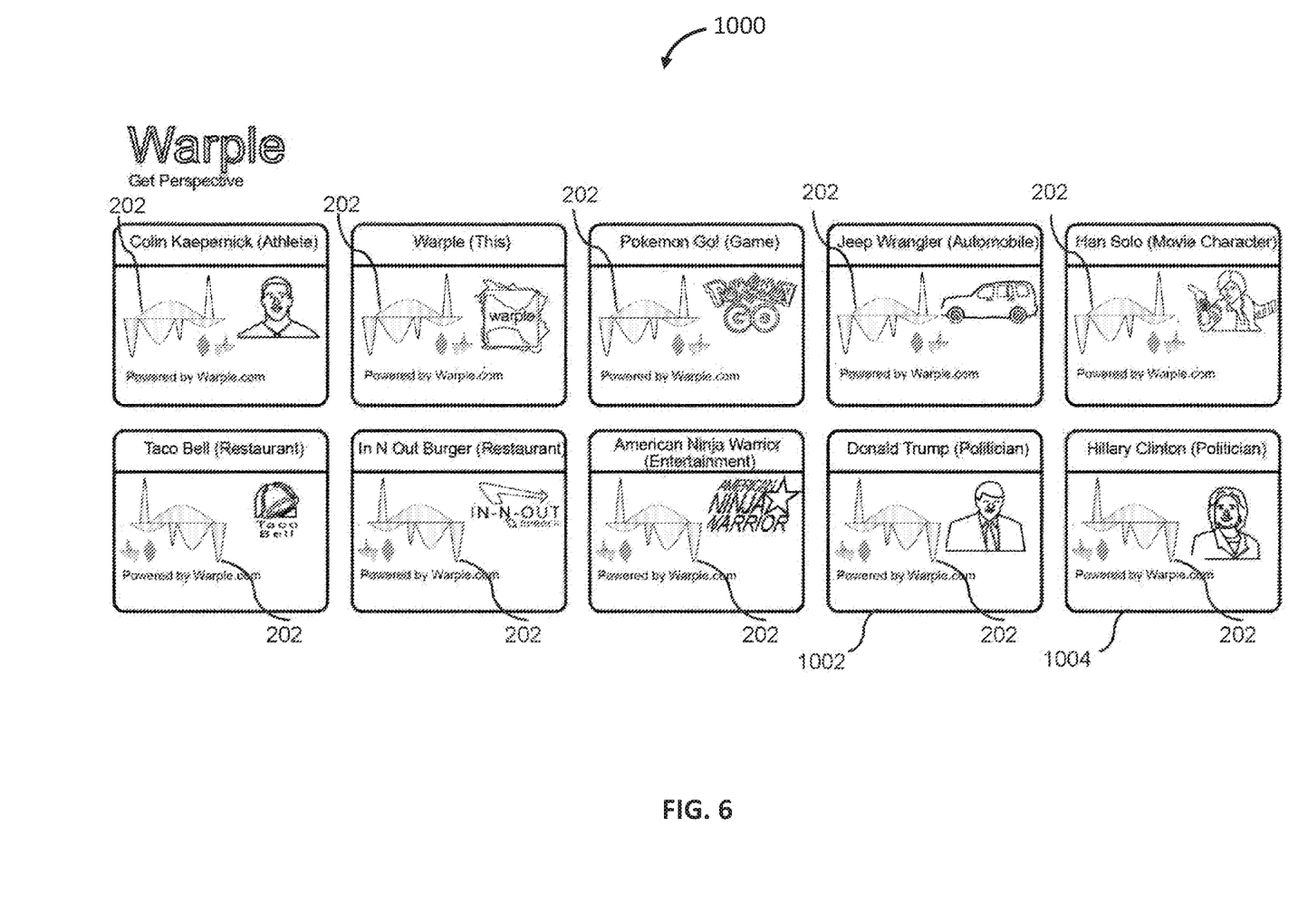
FIG. 6 illustrates a GUI, in accordance with one or more implementations.

FIG. 6 illustrates a GUI 1000, in accordance with one or more implementations. GUI 1000 has a plurality of tiles, or icons, such as icon 1002 and icon 1004. Within the various icons are web widgets 202 that may be changing or morphing in real-time or near real-time. The various icons have unique web widgets 202. GUI 1000 allows a user to select from a plurality of web widgets by actuating an icon. In this example, an actuating icon 1002 may provide a web widget, or expanded web widget, related to Donald Trump as a politician. One may also desire to actuate a different icon that may provide a web widget related to Donald Trump as an investor. Actuating an icon 1004 may provide a web widget related to Hillary Clinton as a politician. The web widgets and expanded web widgets may display aggregated datasets that may be changing or morphing in real-time or near real-time. In some implementations, web widgets 202 and expanded web widgets 206 may be rotated about various axes. Web widgets 202 and expanded web widgets 206 may be zoomed in upon and manipulated using a mouse, keyboard, or the like. Users may enter input data relating to sentiment and/or opinion on various aspects related to a given icon or tile. The aggregated dataset waveforms may change according to user input.

In some implementations, web widget 202 and/or expanded web widget 206 may have selectors associated therewith. For example, the selectors may include one or more of "Labels," "Horizontal," "Halo & Base," "Rotate," and/or other selectors. In some implementations, these selectors may be checked or unchecked. Checking or unchecking "Labels" may cause the names of various aspects to be displayed or not. Checking "Horizontal" may cause the names of the aspects to be displayed horizontally as opposed to vertically, or vice versa. Checking "Halo & Base" may cause various planes to be displayed or not. These planes may be circular discs (for example) and may be at various elevations. Checking "Rotate" may cause web widget 202 and/or expanded web widget 206 to begin or stop rotating. Web widget 202 and/or expanded web widget 206 may also be manually rotated with one or more of a mouse, keyboard, finger, and/or the like.

It is noteworthy that some implementations according to the present technology provide an advantageous approach to visual representation of positive and negative data points and distributions within aggregate data sets. These data points may be the result of analytics, feedback, ratings, opinions, etc. (anything that can be measured or captured on a scale of any kind). In some implementations, when the user makes a selection, a processor(s) converts the selection to a numeric value and stores it in a database. If a user has previously provided data on a particular entity, perspective, aspect, etc., their previous values are updated with the current values. As additional users submit values, these are similarly attributed to the entity and the visual presentation displays the aggregate data in real time or near real time. The technology uses a novel approach to data collection that preserves the individual data points and also aggregates them so the collective and comprehensive view of the entity may be retrieved instantly. This minimizes processing delays and saves computer resources, improving the overall function of a computer and software.

In some implementations, a distributed system is utilized to allow any number of endpoints/interfaces to consolidate data into a common repository and display data from the common repository. This is a novel approach to data collection and data sharing that eliminates siloed data that is only usable/accessible on the hosting platform. The technology is embeddable in virtually any existing web, mobile, or desktop application/platform.

In some implementations, server(s) 102, user computing platform(s) 104, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, user computing platform(s) 104, and/or external resources 124 may be operatively linked via some other communication media.

A given user computing platform 104 may include one or more processors configured to execute machine-readable instructions. The machine-readable instructions may be configured to enable an expert or user associated with the given user computing platform 104 to interface with system 100 and/or external resources 124, and/or provide other functionality attributed herein to user computing platform(s) 104. By way of non-limiting example, the given user computing platform 104 may include one or more of a desktop computer, a laptop computer, a handheld computer, a tablet computing platform, a NetBook, a Smartphone, a gaming console, and/or other computing platforms.

External resources 124 may include sources of information, hosts and/or providers of digital media items outside of system 100, external entities participating with system 100, and/or other resources. In some implementations, some or all of the functionality attributed herein to external resources 124 may be provided by resources included in system 100.

Server(s) 102 may include electronic storage 126, one or more processors 128, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 126 may comprise non-transitory storage media that electronically stores information. The electronic storage media of electronic storage 126 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 128, information received from server(s) 102, information received from user computing platform(s) 104, and/or other information that enables server(s) 102 to function as described herein.

Processor(s) 128 is configured to provide information processing capabilities in server(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include a plurality of processing units. These processing units may be physically located within the same device, or processor(s) 128 may represent processing functionality of a plurality of devices operating in coordination. The processor(s) 128 may be configured to execute machine-readable instruction components 108, 110, 112, 114, and/or other machine-readable instruction components and subcomponents. The processor(s) 128 may be configured to execute machine-readable instruction components 108, 110, 112, 114, and/or other machine-readable instruction components and subcomponents by software; hardware; firmware; some combination of software, hardware, and/or firmware; and/or other mechanisms for configuring processing capabilities on processor(s) 128.

It should be appreciated that although machine-readable instruction components 108, 110, 112, 114 are illustrated in FIG. 1 as being implemented within a single processing unit, in implementations in which processor(s) 128 includes multiple processing units, one or more of machine-readable instruction components 108, 110, 112, and/or 114 may be implemented remotely from the other components and/or subcomponents. The description of the functionality provided by the different machine-readable instruction components 108, 110, 112, and/or 114 described herein is for illustrative purposes, and is not intended to be limiting, as any of machine-readable instruction components 108, 110, 112, and/or 114 may provide more or less functionality than is described. For example, one or more of machine-readable instruction components 108, 110, 112, and/or 114 may be eliminated, and some or all of its functionality may be provided by other ones of machine-readable instruction components 108, 110, 112, and/or 114. As another example, processor(s) 128 may be configured to execute one or more additional machine-readable instruction components and/or subcomponents that may perform some or all of the functionality attributed below to one of machine-readable instruction components 108, 110, 112, and/or 114.

Figure 7:
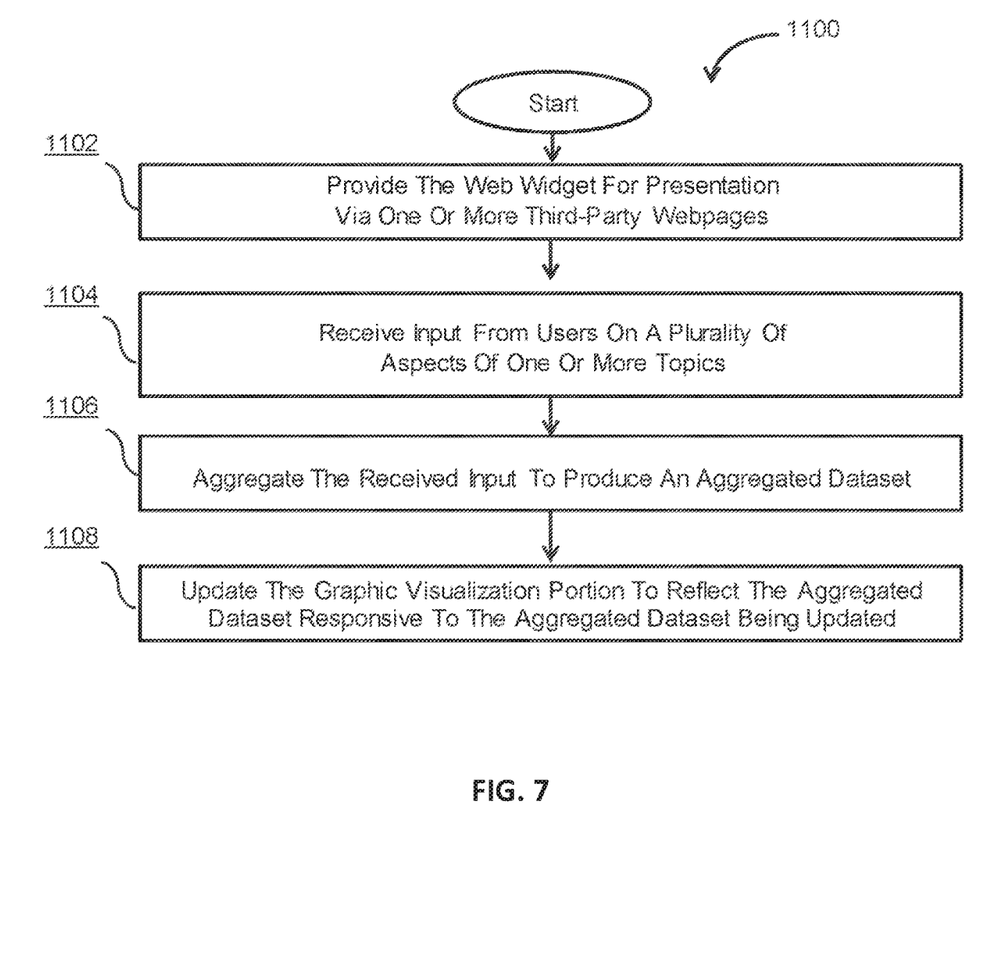
FIG. 7 illustrates a method for obtaining opinion data from individuals via a web widget and displaying a graphic visualization of aggregated opinion data via the web widget, in accordance with one or more implementations.

FIG. 7 illustrates a method 1100 for obtaining opinion data from individuals via a web widget 202 and/or an expanded web widget 206 and displaying a graphic visualization of aggregated opinion data via web widget 202 and/or and expanded web widget 206, in accordance with one or more implementations. The operations of method 1100 presented below are intended to be illustrative. In some implementations, method 1100 may be accomplished with one or more additional operations not described, and/or without one or more of the operations discussed. Additionally, the order in which the operations of method 100 are illustrated in FIG. 7 and described below is not intended to be limiting.

In some implementations, method 1100 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1100 in response to instructions stored electronically on an electronic storage medium. The one or more processing devices may include one or more devices configured through hardware, firmware, and/or software to be specifically designed for execution of one or more of the operations of method 1100.

At an operation 1102, web widget 202 and/or and expanded web widget 206 may be provided for presentation via one or more third-party webpages. Operation 1102 may be performed by one or more hardware processors configured to execute a machine-readable instruction component that is the same as or similar to providing web widget component 108 (as described in connection with FIG. 1), in accordance with one or more implementations.

At an operation 1104, input may be received from users on a plurality of aspects of one or more topics. Operation 1104 may be performed by one or more hardware processors configured to execute a machine-readable instruction component that is the same as or similar to receiving input component 110 (as described in connection with FIG. 1), in accordance with one or more implementations.

At an operation 1106, received input may be aggregated to produce an aggregated dataset. Operation 1106 may be performed by one or more hardware processors configured to execute a machine-readable instruction component that is the same as or similar to aggregate component 112 (as described in connection with FIG. 1), in accordance with one or more implementations.

At an operation 1108, a graphic visualization portion may be updated to reflect the aggregated dataset responsive to the aggregated dataset being updated. Operation 1108 may be performed by one or more hardware processors configured to execute a machine-readable instruction component that is the same as or similar to updating component 114 (as described in connection with FIG. 1), in accordance with one or more implementations.

As discussed herein, "waveforms" may be composed using various methods and options. The "waveforms" may be segregated and/or segmented or contiguous. Waveforms may also be composed of various sinusoid or non-sinusoid forms, curved waves, square-tooth waves, triangular waves or saw-tooth saves, or any combination of these. The term "widget" is not limited to any particular platform and may include functionality implemented in a web browser or native application via JavaScript™, Web Components, Adobe Flash™, Java™, and the like.

When rendering on the POW graph (or other user interfaces like those described herein) on a client web browser, independently or in conjunction with the widget, the POW graph and/or widget can be rendered at the server or client to make efficient use of computing resources. WebGL, HTML5 and CSS, or any combination of these, may be used (e.g., executed on a computing device to the described effect). When rendering the POW graph in a native application, GDI, DirectX, QuickDraw or other graphics technologies may be used depending on the platform and resources.

In some implementations, the POW graph (or other user interfaces like those described herein) may be rendered using a graphics technology (e.g., like those enumerated above) and may be subsequently converted to an image format such as JPEG, GIF, PNG, TIFF or other suitable image format to accommodate environments and/or devices where a static representation is required and/or desired, such as a report displayed on a web page or printed in hard copy or where it is not possible and/or feasible to generate the graph using a graphics technology due to technology or resource limitations.

In some embodiments, the system for collecting, aggregating, and distributing data in the web environment utilizes WebSockets, web services and Javascript AJAX to provide real time (e.g., within 5 seconds or within 500 milliseconds, or faster, depending on the use case), or near real time, data collection and replication. This implementation provides the benefit of background processing to send and receive data without page refreshes and/or user-initiated events. It should be emphasized though that embodiments are not limited to systems that afford all of the benefits described herein, or fully provided those benefits to the full effect described, as various engineering and cost tradeoffs may reduce these advantages while still benefiting from the present techniques.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A tangible, non-transitory, machine-readable medium storing instructions that, when executed by one or more processors, perform operations comprising:
   providing, with at least one of the one or more processors, a web widget for presentation via a third-party webpage, the web widget comprising an input portion and a graphic visualization portion, wherein a first instance of the web widget is presented via the third-party webpage;
   receiving, with at least one of the one or more processors, via the input portion, a first input on an aspect of a topic, the first input conveying a first response value for the aspect, wherein the first input is received after a first manipulation of the input portion of the first instance of the web widget, and wherein the third-party webpage is responsive to the first manipulation of the input portion of the first instance of the web widget;
   storing, with at least one of the one or more processors, the first response value in a record value of a database;
   aggregating, with at least one of the one or more processors, the first response value of the first input with other received response values to produce an aggregated dataset determined from a plurality of record values stored in the database corresponding to the aspect wherein the aggregated dataset is updated in response to the first input being received;
   updating, with at least one of the one or more processors, the graphic visualization portion to reflect the aggregated dataset in response to the aggregated dataset being updated, wherein the graphic visualization portion comprises an aggregated dataset waveform corresponding to the aspect, and wherein the aggregated dataset waveform is defined such that a dimension parallel to a horizontal plane corresponds to a strength of aggregated sentiment;
   receiving, with at least one of the one or more processors, a second input on the aspect conveying a second response value after a second manipulation of the input portion of the first instance of the web widget;
   updating, with at least one of the one or more processors, the record value stored in the database with the second response value; and
   updating, with at least one of the one or more processors, the aggregated dataset waveform based on the record value updated with the second response value, wherein:
      a first base of the aggregated dataset waveform is defined by a first straight line length between a first pair of intersection points between the aggregated dataset waveform and the horizontal plane,
      a first peak is on a first waveform segment of the aggregated dataset waveform between the first pair of intersection points and indicates the first response value,
      a second base of the aggregated dataset waveform is defined by a second straight line length between a second pair of intersection points between the aggregated dataset waveform and the horizontal plane,
      a second peak is on a second waveform segment of the aggregated dataset waveform is between the second pair of intersection points and indicates the second response value, the horizontal plane comprises a defined length that is co-linear with the first base and the second base, the first base and the second base do not overlap, a ratio of the first base and the defined length is equal to a ratio of a count of inputs conveying the first response value to a total number of inputs, and a ratio of the second base and the defined length is equal to a ratio of a count of inputs conveying the second response value to the total number of inputs.

2. The medium of claim 1, wherein the aggregated dataset waveform has a projection in a first direction perpendicular to the horizontal plane that represents a positive user sentiment or opinion for the aspect.

3. The medium of claim 2, wherein the aggregated dataset waveform has a projection in a second direction perpendicular to the horizontal plane that represents a negative user sentiment or opinion for the aspect, the second direction being opposite with respect to and away from the first direction.

4. The medium of claim 1, wherein the input portion comprises a slider that is manipulable in a continuous fashion.

5. The medium of claim 1, wherein the input portion comprises a slider that is that is manipulable in a discrete fashion.

6. The medium of claim 1, wherein the input portion comprises a plurality of buttons.

7. The medium of claim 1, wherein the aggregated dataset waveform does not represent an average, mean, or median.

8. The medium of claim 1, wherein the first instance of the web widget is rotatable about one or more axes.

9. The medium of claim 1, wherein the graphic visualization portion changes appearance in real-time based on received inputs, and wherein the received inputs are received from a plurality of users.

10. A method comprising:

providing, with one or more processors, a web widget for presentation via a third-party webpage, the web widget comprising an input portion and a graphic visualization portion, wherein a first instance of the web widget is presented via the third-party webpage;

receiving, with one or more processors, via the input portion, a first input on an aspect of a topic, the first input conveying a first response value for the aspect, wherein the first input is received after a first manipulation of the input portion of the first instance of the web widget, and wherein the third-party webpage is responsive to the first manipulation of the input portion of the first instance of the web widget;

storing, with one or more processors, the first response value in a record of a database;

aggregating, with one or more processors, the first response value of the first input with other received response values to produce an aggregated dataset determined from a plurality of record values stored in the database corresponding to the aspects, wherein the aggregated dataset is updated in response to the first input being received;

updating, with one or more processors, the graphic visualization portion to reflect the aggregated dataset in response to the aggregated dataset being updated, wherein the graphic visualization portion comprises an aggregated dataset waveform corresponding to the aspect, wherein the aggregated dataset waveform is defined such that a dimension parallel to a plane shown in the graphic visualization portion corresponds to a strength of aggregated sentiment;

receiving, with one or more processors, a second input on the aspect conveying a second response value after a second manipulation of the input portion of the first instance of the web widget;

updating, one or more processors, the record stored in the database with the second response value; and updating, with one or more processors, the aggregated dataset waveform based on the record updated with the second response value, wherein:

a first base of the aggregated dataset waveform is defined by a first straight line length between a first pair of intersection points between the aggregated dataset waveform and the plane, a first peak is on a first waveform segment of the aggregated dataset waveform between the first pair of intersection points and indicates the first response value, a second base of the aggregated dataset waveform is defined by a second straight line length between a second pair of intersection points between the aggregated dataset waveform and the plane, a second peak is on a second waveform segment of the aggregated dataset waveform is between the second pair of intersection points and indicates the second response value, the plane comprises a defined length that is co-linear with the first base and the second base, the first base and the second base do not overlap, a ratio of the first base and the defined length is equal to a ratio of a count of inputs conveying the first response value to a total number of inputs, and a ratio of the second base and the defined length is equal to a ratio of a count of inputs conveying the second response value to the total number of inputs.

11. The method of claim 10, wherein the aggregated dataset waveform has a projection in a first direction perpendicular to the plane that represents a positive user sentiment or opinion for the aspect.

12. The method of claim 11, wherein the aggregated dataset waveform has a projection in a second direction perpendicular to the plane that represents a negative user sentiment or opinion for the aspect, the second direction being opposite with respect to and away from the first direction.

13. The method of claim 10, wherein the input portion comprises a slider that is manipulable in a continuous fashion.

14. The method of claim 10, wherein the input portion comprises a slider that is that is manipulable in a discrete fashion.

15. The method of claim 10, wherein the input portion comprises a plurality of buttons.

16. The method of claim 10, wherein the aggregated dataset waveform does not represent an average, mean, or median.

17. The method of claim 10, wherein the first instance of the web widget is rotatable about one or more axes.

18. The method of claim 10, wherein the graphic visualization portion changes appearance in real-time as users provide input and/or input is received from a plurality of users from a plurality of third-party web sites or anywhere where the web widget is displayed.

19. A scheduling system comprising:
one or more hardware processors; and
memory storing instructions that, when executed by the one or more hardware processors, cause the one or more hardware processors to perform operations comprising:
    providing, with at least one of the one or more processors, a web widget for presentation via a third-party webpage, the web widget comprising an input portion and a graphic visualization portion, wherein a first instance of the web widget is presented via the third-party webpage;
    receiving, with at least one of the one or more processors, via the input portion, a first input on an aspect of a topic, the first input conveying a first response value for the aspect, wherein the first input is received after a first manipulation of the input portion of the first instance of the web widget, and wherein the third-party webpage is responsive to the first manipulation of the input portion of the first instance of the web widget;
    storing, with at least one of the one or more processors, the first response value in a record value of a database;
    aggregating, with at least one of the one or more processors, the first response value of the first input with other received response values to produce an aggregated dataset determined from a plurality of record values stored in the database corresponding to the aspect, wherein the aggregated dataset is updated in response to the first input being received;
    updating, with at least one of the one or more processors, the graphic visualization portion to reflect the aggregated dataset in response to the aggregated dataset being updated, wherein the graphic visualization portion comprises an aggregated dataset waveform corresponding to the aspect, wherein the aggregated dataset waveform is defined such that a dimension parallel to a horizontal plane corresponds to a strength of aggregated sentiment;
    receiving, with at least one of the one or more processors, a second input on the aspect conveying a second response value after a second manipulation of the input portion of the first instance of the web widget;
    updating, with at least one of the one or more processors, the record value stored in the database with the second response value; and
    updating, with at least one of the one or more processors, the aggregated dataset waveform based on the record value updated with the second response value, wherein:
        a first base of the aggregated dataset waveform is defined by a first straight line length between a first pair of intersection points between the aggregated dataset waveform and the horizontal plane,
        a first peak is on a first waveform segment of the aggregated dataset waveform between the first pair of intersection points and indicates the first response value,
        a second base of the aggregated dataset waveform is defined by a second straight line length between a second pair of intersection points between the aggregated dataset waveform and the horizontal plane,
        a second peak is on a second waveform segment of the aggregated dataset waveform is between the second pair of intersection points and indicates the second response value,
        the horizontal plane comprises a defined length that is co-linear with the first base and the second base,
        the first base and the second base do not overlap,
        a ratio of the first base and the defined length is equal to a ratio of a count of inputs conveying the first response value to a total number of inputs, and
        a ratio of the second base and the defined length is equal to a ratio of a count of inputs conveying the second response value to the total number of inputs.

20. The system of claim 19, wherein the graphic visualization portion changes appearance in real-time based on received inputs, and wherein the received inputs are received from a plurality of users.

* * * * *